128. INTERNAL COMBUSTION ENGINES,
Liquid piston.
No. 768,110. PATENTED AUG. 23, 1904.
L. BAYER.
INTERNAL COMBUSTION ENGINE.
APPLICATION FILED JULY 11, 1902.
NO MODEL. 3 SHEETS—SHEET 1.
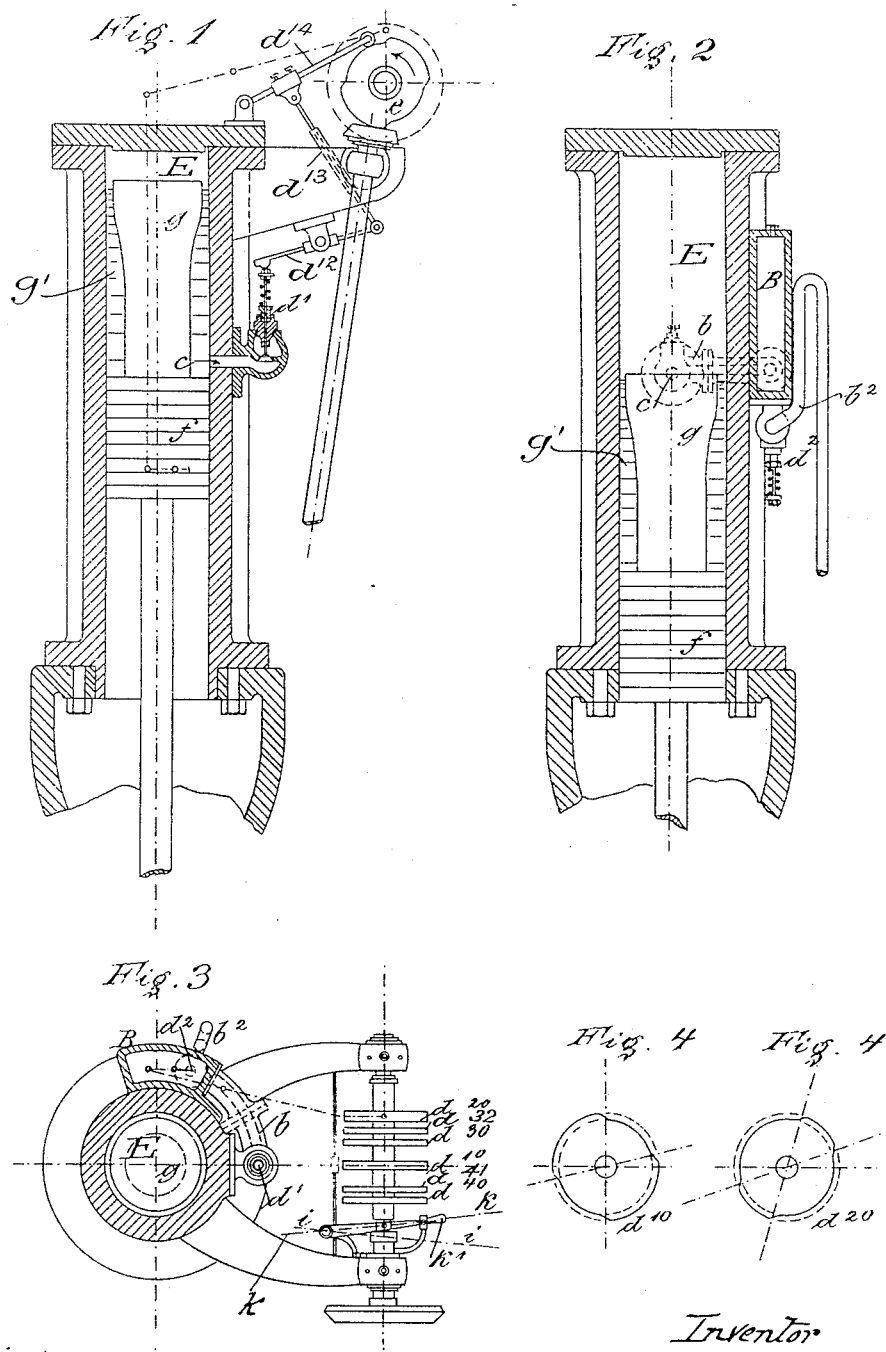
Witnesses
Inventor
Ludwig Bayer 123. INTERNAL COMBUSTION ENGINES,
Liquid piston.
No. 768,110. PATENTED AUG. 23, 1904.
L. BAYER.
INTERNAL COMBUSTION ENGINE.
APPLICATION FILED JULY 11, 1902.
NO MODEL. 3 SHEETS—SHEET 2.
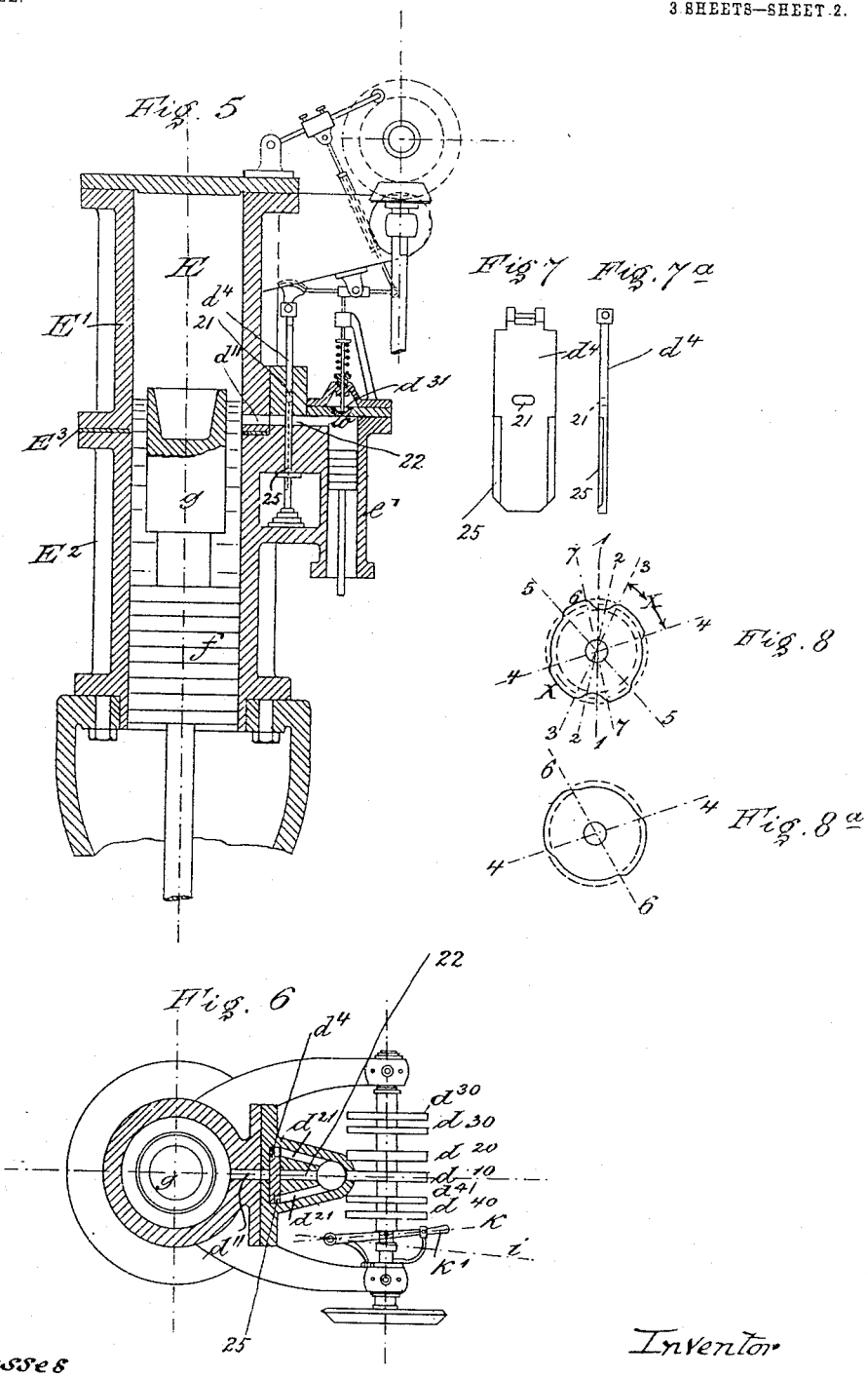

No. 768,110. PATENTED AUG. 23, 1904.
L. BAYER.
INTERNAL COMBUSTION ENGINE.
APPLICATION FILED JULY 11, 1902.
NO MODEL. 3 SHEETS—SHEET 3.
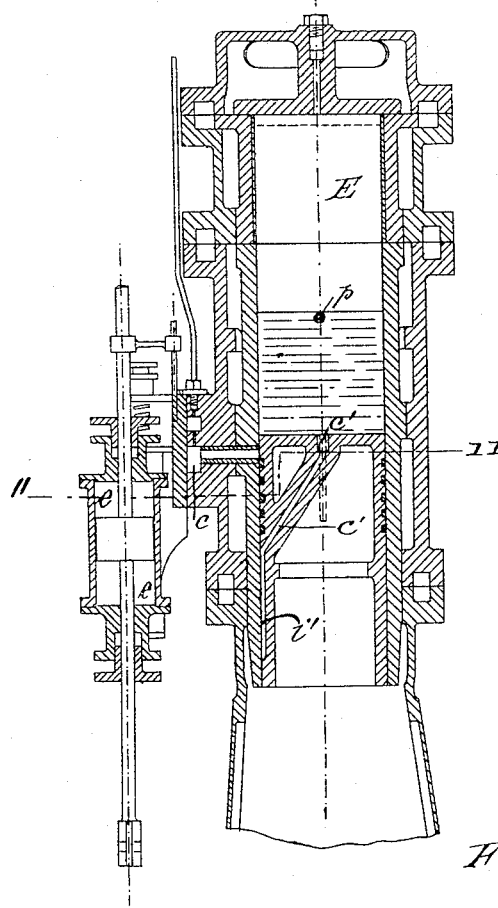
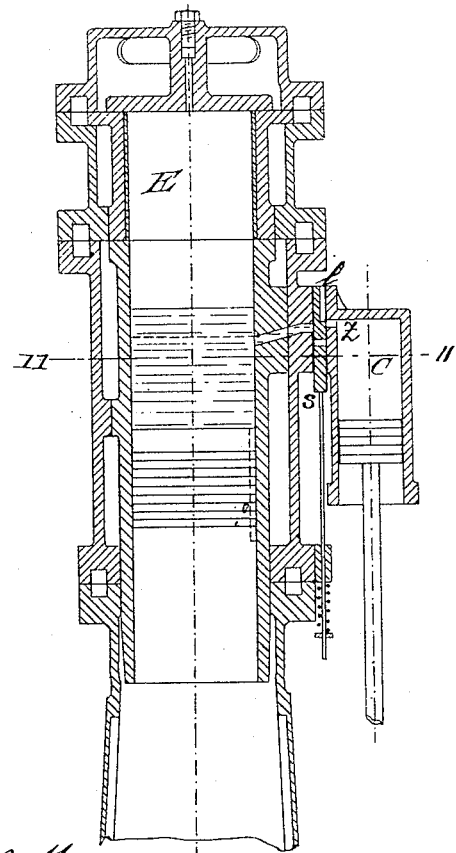
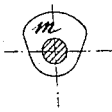
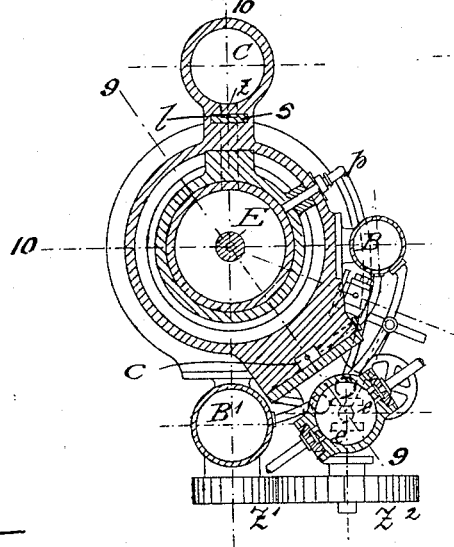
Witnesses
Inventor
Ludwig Bayer No. 768,110.

Patented August 23, 1904.

UNITED STATES PATENT OFFICE.

LUDWIG BAYER, OF MUNICH, GERMANY.

INTERNAL-COMBUSTION ENGINE.

SPECIFICATION forming part of Letters Patent No. 768,110, dated August 23, 1904.

Application filed July 11, 1902. Serial No. 115,214. (No model.)

*To all whom it may concern:*

Be it known that I, LUDWIG BAYER, a subject of the King of Bavaria, residing at Munich, Germany, have invented a certain new and useful Improvement in Internal-Combustion Engines with Liquid Piston-Packing, of which the following is a specification.

This invention relates to improvements in explosion or internal-combustion engines with liquid piston-packing; and it consists in certain improvements upon the construction described in the specification of my United States Patent No. 668,706, granted February 26, 1901.

In the accompanying drawings, Figure 1 is a vertical section of the motor-cylinder and adjacent parts. Fig. 2 is a vertical section of the motor-cylinder at right angles to Fig. 1, with the piston in a different position. Fig. 3 is a plan of Fig. 1, partly in section, the valve-operating levers being omitted. Figs. 4 and $4^a$ are detail views of the cams for operating certain valves. Fig. 5 is a vertical section of a modified form. Fig. 6 is a plan view thereof, partly in section and with valve-operating levers omitted. Figs. 7 and $7^a$ are detail views of a part of Fig. 5, and Figs. 8 and $8^a$ show detail views of the valve-controlling cams of the modified form. Fig. 9 is a section on line 9 9 of Fig. 11, representing another arrangement without the use of a controlled valve for the outlet of the sealing liquid, but with a pump, the lower half of which serves for replacing the sealing liquid in the explosion-cylinder and the upper half for producing the necessary vacuum. Fig. 10 is a further section on line 10 10 of Fig. 11, illustrating the manner in which the sealing liquid can be used for doing work with the aid of a cylinder C. Fig. $10^a$ is a detail view. Fig. 11 is a horizontal section of the apparatus shown in Figs. 9 and 10 substantially on line 11 11 of said figures.

The form of construction shown in Figs. 1 to 4 is based upon the known construction of the Diesel motor as modified according to this invention, with atmospheric pressure existing in the chamber B.

E is the cylinder of the engine; $f$, the piston therein; $g$, an extension of the piston, around which is an annular cavity $g'$ for the sealing liquid.

In the wall of the explosion-cylinder E there is a lateral aperture $c$ leading to the chamber of the valve $d'$, adapted to make and break communication between the cylinder E and the external chamber B through pipe $b$.

A valve $d^2$ controls outlet from chamber B to the atmosphere through the siphon-pipe $b^2$. The series of cams by which the various valves of the motor are controlled are shown in Fig. 3, the levers upon which they operate being omitted from the figure. The set of cams is slidable longitudinally of their common axis under the operation of the hand-lever $k'$. The cam $d^{30}$ or $d^{32}$, according to the position of the lever $k'$, operates the inlet-valve (not shown) of the motor. The cam $d^{40}$ or $d^{41}$, according to the position of the lever $k'$, operates the exhaust-valve (not shown) of the motor. The cam $d^{10}$ in both positions operates the valve $d'$ through the levers $d^{11}$ $d^{12}$ and connecting-link $d^{13}$. (Shown in Fig. 1.) The cam $d^{20}$ operates in both positions the valve $d^2$ through similar lever mechanism. (Not shown.) The position $k$ $k$ of lever $k'$ corresponds to the position of the cams for starting the motor. The position $i$ $i$ of said lever $k'$ corresponds to the position of the cams when the motor is in operation, cams $d^{41}$ and $d^{32}$ being then operating in place of cams $d^{40}$ and $d^{30}$, respectively. As in this respect and as regards the remainder of the valve-operating mechanism the construction is that of the Diesel motor, which is well known and forms no part of the present invention, further illustration and description thereof is not necessary.

The chamber B is filled to a certain height with liquid, and a certain pressure exists or is established therein, preferably normal atmospheric pressure, but superpressure or vacuum, if desired. The operation of the valve $d'$ in relation to the piston-stroke is regulated in such a manner that before the piston has reached its highest position during its inward movement the valve $d'$ is opened, so that a small quantity of the liquid in the cylinder can escape from the cylinder E. This opening of the valve is only necessary to the extent of neutralizing the upward tendency of motion imparted to the liquid by the piston by producing a downward tendency of equal value. The quantity of liquid removed from the cylinder must be returned at the proper moment to the cylinder again by means of a suitable device—for instance, a pump, as hereinafter described.

When atmospheric pressure exists in the vessel B, the working phases in the explosion-cylinder must be so arranged that the pressure in the said cylinder is always suitably higher than that in the vessel B, since otherwise suction and exhaust into and from the explosion-cylinder cannot take place from and into the free atmosphere. If there is an under pressure in the vessel B, no impediment exists to this suction and exhaust from and into the free atmosphere.

By the controlled valve $d^2$ and the pipe $b^2$ the desired emptying of the chamber B is permitted and regulated, so that when the valve $d'$ is closed the atmospheric pressure and liquid-level in the chamber B readjust themselves in the manner intended. If, however, a vacuum is to exist in the chamber B, a small vacuum-pump is used in place of the valve $d^2$, the said pump sucking the superfluous liquid from the chamber in a similar manner to the condenser-pumps of steam-engines.

In the construction shown in Figs. 9 and 11 the pump $e$ performs the double function of returning to the cylinder E the packing liquid expelled therefrom and acting as a vacuum-pump for the chamber B. The upper half of the pump is therefore in communication with the chamber B, from which it removes superfluous liquid, the latter being forced to the chamber B'. The lower half sucks liquid from the chamber B' for replenishment and forces it through $p$ to the explosion-cylinder, Fig. 11. The pump $e$ performs half as many strokes as the motor. Fig. 9 also represents a modification, inasmuch as the aperture $c$ in the wall of cylinder E is normally covered by the piston, but communicates at the proper time with a groove $i'$ in the side of the piston, whence a passage-way $c'$ leads to the upper surface of the piston. Through an aperture in the cylinder-walls, at the level of the spot marked $p$ in Fig. 9, fresh liquid is supplied to the cylinder E. The pump $e$ is driven by means of toothed gear $Z'$ $Z^2$, Fig. 11, from the motor-shaft. The sealing liquid can also be used for doing work. For this purpose a cylinder C is connected to the explosion-cylinder E by a controllable aperture Z, Figs. 10 and 11. The piston in the cylinder C travels upward and downward uniformly with the piston in the cylinder E. At the beginning of and during the explosion-stroke in the cylinder E the aperture Z is open and part of the liquid is admitted to the cylinder C to do work there. During the exhaust-stroke the liquid is forced back from cylinder C to the cylinder E. At the end of the exhaust-stroke the aperture Z is closed and the cylinder C is connected to the atmosphere by the groove $l$ in its slide-valve $s$ during the suction and compression strokes. The slide $s$ is operated by the cam-disk $m$. (Shown in Fig. 10$^a$.)

A practical modification of the construction is illustrated in Figs. 5 to 8$^a$. The chamber hereinbefore referred to as chamber B is in this case formed as a cylinder $e'$, in which works a piston the crank of which is in advance of that of the piston of the cylinder E by a certain amount, (about ninety to one hundred degrees,) so that when the piston of cylinder E is at its upper dead-point the piston of cylinder $e'$ has completed part of its return stroke. The cylinder $e'$ and its piston perform the twofold purpose, on one hand, of producing the rarefications of air required to counteract the injurious effect of the concussion of the packing liquid when thrown forward and, on the other hand, of replacing in the cylinder E the packing liquid lost through evaporation or the like. A passage $d^{11}$ is formed in the side of the cylinder E and communicates with a passage 22 in the side of the cylinder $e'$ by means of a passage 21 in a slide-valve $d^4$. Passages $d^{21}$ are also formed in the cylinder $e'$, which communicate with the atmosphere by means of passages 25 at the edges of the slide-valve $d^4$. A passage $d^{31}$ is also provided in the cover of the cylinder $e'$ and is provided with a valve $w$, through which liquid is drawn from the reserve chamber B'. (See Fig. 11.)

While the piston $f$ of the cylinder E performs its four functions in the usual manner—namely, first, suction; second, compression and explosion; third, expansion; fourth, exhaust—the cylinder $e'$, with its piston in advance, (ninety to one hundred degrees,) acts in the following manner: When the piston of cylinder $e'$ is at or just past its upper dead-point, the air-passage $d^{21}$ is opened for a moment, so that air from the outer atmosphere can enter the cylinder $e'$, (phase 1.) When this has taken place, the air-passage $d^{21}$ is closed, (phase 2,) and while the piston recedes farther the air in the cylinder $e'$ is rarefied. Thereupon communication is opened between the latter and the cylinder E, and by this means the effect of the packing liquid thrown forward by the piston $f$ is counteracted, (phase 3.) The piston $f$ will then have reached its upper dead-point, while the piston of the cylinder $e'$ will have completed ninety or one hundred degrees of its downward path. Shortly after the reversal of the piston $f$ from the up to the down stroke the aperture $d^{11}$ is closed, and immediately afterward valve $w$ is opened, (phase 4,) so that replacing liquid is sucked from the chamber B', similar to that shown in Fig. 11, through aperture $d^{31}$ into the cylinder $e'$. When the piston of cylinder $e'$ has reached its lower dead-point, there is in the cylinder $e'$, first, the liquid removed from the cylinder E; second, the replacing liquid sucked out of the chamber B'; third, rarefied air. At the commencement of the upward movement of the piston of cylinder $e'$ the valve $w$ remains open, so that the space in cylinder $e'$ is gradually completely filled with liquid. When this has been done, aperture $d^{11}$ is opened, (phase 5,) and immediately afterward valve $w$ is closed, (phase 6,) and then the liquid in cylinder $e'$, consisting of that previously removed from the cylinder E and the replacing liquid supplied from chamber B' through valve $w$ is conveyed into the cylinder E. At the moment at which the piston of the cylinder $e'$ reaches its upper dead-point aperture $d^{11}$ is closed (phase 7) and the action begins again with phase 1. According to whether phases 5 and 6 occur sooner or later more or less replacing liquid enters the cylinder E, and this gives means for adjustably regulating the quantity of liquid to be supplied to the cylinder E.

In the drawings the apertures $d^{11}$ and $d^{21}$ are governed by a single part—a slide $d^4$. (Shown in front elevation in Fig. 7 and in side elevation in Fig. 7$^a$.)

Fig. 8 shows the form of the controlling-cam for the apertures $d^{11}$ and $d^{21}$; Fig. 8$^a$, the form of the controlling-cam for valve $w$. $x$ indicates the angle at which the crank of the piston of cylinder $e'$ is in advance of that of the piston of cylinder E. When the roller of the controlling-lever of apertures $d^{11}$ and $d^{21}$ is on the larger radius of the controlling-cam, Fig. 8, $d^{11}$ is open and $d^{21}$ closed; when on the intermediate radius, $d^{11}$ and $d^{21}$ are both closed, and when on the lesser radius, $d^{21}$ is open and $d^{11}$ closed. The number of rotations of the controlling-cams is half that of the rotations of the motor crank-shaft.

The numerals 1 to 7 in Figs. 8 and 8$^a$ indicate the phases of opening and closing of apertures $d^{11}$ and $d^{21}$ and $d^{31}$, above referred to.

To prevent the heat from being too largely distributed over the cylinder E, which is comparatively high, owing to the construction, it will in some cases be advisable to construct the cylinder in two parts—viz., the explosion portion E' and the guide portion E$^2$ for the piston—and to place a washer or packing E$^3$ of a bad conductor of heat between these parts. The lining for the walls of the explosion-chamber of the cylinder may be of graphite or the like.

The form of piston-head $g$ (shown in Fig. 5) is used in order that the level of the liquid impinging on the cylinder-walls should be as near as possible to the cylinder-cover when the piston is at its upper dead-point.

Calculation shows that the size of the aperture $d^{11}$ is not limited to any fixed dimensions for neutralizing the *vis viva* of the liquid. It is therefore advisable to have $d^{11}$ as small as possible to reduce the loss of liquid removed.

I claim—

1. In an explosion or internal-combustion engine, the combination with the explosion-cylinder and piston therein, and a liquid sealing-column above the piston in the explosion-cylinder, of a chamber, an aperture for connecting same with the explosion-cylinder, an intermediate controlled closing device in said aperture and means for opening said device before the termination of the upstroke of the piston whereby a portion of the packing liquid is allowed to pass out into said chamber, to counteract the upward kinetic energy of the liquid on reversal of the piston.

2. In an explosion or internal-combustion engine, the combination with the explosion-cylinder and piston therein, and a liquid sealing-column above the piston in the explosion-cylinder, of a chamber, an aperture for connecting same with the explosion-cylinder, an intermediate controlled closing device in said channel, means for opening said device before the termination of the upstroke of the piston whereby a portion of the packing liquid is allowed to pass out into said chamber to counteract the upward kinetic energy of the liquid on reversal of the piston, and a cylinder C wherein the liquid thus released from the explosion-cylinder can be used for work.

3. In an explosion or internal-combustion engine, the combination with the explosion-cylinder and piston therein, and a liquid sealing-column above the piston in the explosion-cylinder, of a chamber consisting of a cylinder, a piston therein, an aperture for connecting same with the explosion-cylinder, an intermediate controlled closing device in said channel, means for opening said device before the termination of the upstroke of the piston, whereby a portion of the packing liquid is allowed to pass out into said chamber to counteract the upward kinetic energy of the liquid on reversal of the piston, a reserve chamber for sealing liquid lost by evaporation, and means for operating the piston of the aforesaid chamber-cylinder as a pump for supplying liquid to the explosion-cylinder, and for drawing off liquid from the reserve chamber.

In witness whereof I have signed this specification in the presence of witnesses.

LUDWIG BAYER.

Witnesses:
M. OTTO GUGEL,
ELWOOD WILSON,
HENRY R. MCGINNIS.